United States Patent [19]
Dietrich et al.

[11] 3,900,532
[45] Aug. 19, 1975

[54] LOW VISCOSITY PASTY RUBBER COMPOSITIONS

[75] Inventors: Manfred Dietrich, Leverkusen; Jochen Schnetger, Berg-Gladbach; Friedrich Haas, Schildgen; Günter Marwede, Leverkusen; Hansgünter Appel, Bergisch-Gladbach, all of Germany

[73] Assignee: Bayer Aktiengesellschaft, Germany

[22] Filed: July 2, 1973

[21] Appl. No.: 375,687

[30] Foreign Application Priority Data
July 7, 1972  Germany............................ 2233359

[52] U.S. Cl. ................................................ 260/879
[51] Int. Cl. ........................ C08f 15/10; C08f 15/14
[58] Field of Search .......................... 260/879, 894

[56] References Cited
FOREIGN PATENTS OR APPLICATIONS
740,039   8/1966   Canada............................... 260/894

Primary Examiner—Joseph L. Schofer
Assistant Examiner—Maria S. Tungol
Attorney, Agent, or Firm—Connolly and Hutz

[57] ABSTRACT

A pasty vulcanisable rubber mixture free from sulphur, containing 100 parts by weight of a high molecular weight rubber which contains OH, SH, NH, $NH_2$, COOH, Cl or Br groups, 50 to 400 parts by weight of a liquid polymer or copolymer of a diene which has a molecular weight of 400 to 10.000 and also contains OH, SH, NH, $NH_2$, COOH, Cl or Br groups and a crosslinking agent for the OH, SH, NH, $NH_2$, COOH, Cl or Br groups present.

3 Claims, No Drawings

LOW VISCOSITY PASTY RUBBER COMPOSITIONS

In published Japanese Patent Application Sho-45-22 617 there is disclosed a process in which synthetic rubber is mixed with a low molecular weight liquid polybutadiene glycol which acts as plasticiser. When this mixture is vulcanized with sulphur and accelerators, a small quantity of a diisocyanate is added which reacts with the polybutadiene glycol by polyaddition and possibly also with SH groups which are formed as intermediate products in the course of vulcanization. The polybutadiene glycol which acts as plasticiser is therefore converted in the vulcanization process into a high molecular weight product which does not adversely affect the properties of the vulcanizate.

The non-vulcanized rubber mixtures obtained are unsuitable for processing in injection moulding apparatus which operate at low injection pressures because they have too high a viscosity. The technological properties of the products are not particularly good.

This invention is based on the finding that a mixture of a high molecular weight rubber which contains reactive groups, a liquid polymer which contains reactive groups and has plasticizing properties and a cross-linking reagent for the reactive groups constitutes a pasty composition which can be processed by injection moulding and which can be cross-linked to give high grade vulcanizates without the addition of sulphur and accelerators.

An object of this invention is therefore a pasty vulcanizable rubber composition which is free from sulphur and which contains 100 parts by weight of a high molecular weight rubber containing 0.5 to 8% by weight of OH, SH, NH, $NH_2$, COOH, Cl or Br groups, 50 to 400 parts by weight of a liquid polymer or copolymer of a diene which has a molecular weight of 400 to 10,000 and contains 0.5 to 8 % by weight of OH, SH, NH, $NH_2$, COOH, Cl or Br groups, and 0.5 to 10 equivalents of a cross-linking agent per equivalent of OH, SH, NH, $NH_2$, COOH, Cl or Br groups present.

This mixture may also contain the usual additives for rubber mixtures such as fillers, anti-oxidants, stabilisers and the like.

High molecular weight rubbers for the purpose of this invention are synthetic or natural rubbers which contain 0.5 to 8% by weight of the reactive groups mentioned above. These rubbers should have molecular weights above 150,000 and preferably of 500,000 to 5,000,000. The rubbers are preferably in a finely divided form, e.g. powders with a particle size of 50 to 300 $\mu$.

Such rubbers can be obtained by copolymerisation in aqueous emulsion or in organic solvents. For this purpose, the rubber forming monomer or monomers and a copolymerisable monomer which contains the reactive groups indicated above are copolymerised. The quantity of this monomer used is such that the rubber contains the required quantity of reactive groups.

Rubber forming monomers for the purpose of this invention are, e.g. conjugated dienes which preferably contain 4 to 8 carbon atoms such as butadiene, isoprene, chloroprene or piperylene, if desired in combination with monoethylenically unsaturated monomers such as styrene, isobutylene, acrylonitrile, acrylic acid, alkyl esters and methacrylic acid alkyl esters.

Cyclic olefines are also suitable, particularly cyclomonoolefins which contain 4 to 12 carbon atoms in the ring and which can be polymerised by ring opening, for example cyclopentene, cyclooctene, cyclododecene and norbornene. Mixtures of ethylene and propylene are also suitable, optionally together with a third monomer which contains two non-conjugated double bonds such as hexadiene-(1,4), norbornadiene or 5-ethylidene-norbornene. This third monomer is generally added in quantities of 1 to 20 % by weight, based on the total quantity of monomers. Polymerisation of these monomers and the rubbers thus formed are known in the art.

To prepare the rubbers forming one constituent of the mixtures of this invention, an additional monomer which contains the specified active groups is copolymerised. The following are examples of such monomers: acrylic acid, methacrylic acid, fumaric acid, maleic acid, itaconic acid, ethylmaleate, 2-sulphoethylacrylate, 2-sulphoethylmethacrylate, sulpho-tert.-butylmethacrylate, 2-aminoethylmethacrylate hydrochloride, vinyl benzylamine, glycidyl methacrylate, hydroxystyrene, allyl alcohol, vinyl benzyl alcohol, 2-hydroxyethylacrylate, 2-hydroxyethylmethacrylate, acrylamide, methacrylamide, bis-N-methylolacrylamide, N-methylolacrylamide, bis-N-methylolmethacrylamide, N-methylol methacrylamide, N-$\beta$-hydroxyethyl acrylamide, N-$\beta$-hydroxyethylmethacrylamide, $\beta$-hydroxypropylacrylate, $\beta$-hydroxypropylmethacrylate, $\alpha$-hydroxypropylacrylate, $\alpha$-hydroxypropylmethacrylate. 6-hydroxyhexylacrylate, 6-hydroxyhexylmethacrylate, sodium styrene sulphonate, sodium-$\alpha$-methylstyrenesulphonate, 2-methylaminoethylacrylate hydrochloride, 2-methylaminoethyl methacrylate hydrochloride, 3-methylaminopropylacrylate hydrochloride, 3-methylaminopropylmethacrylate hydrochloride, 3-methylaminobutylacrylate hydrochloride, 3-methylaminobutylmethacrylate hydrochloride, 3-ethylaminopropylacrylate hydrochloride, styrene sulphonamide, diacetone acrylamide, vinyl oxazoline and vinyliminooxazolidine.

The reactive comonomers are copolymerised in such quantities that the rubber obtained contains 0.5 to 8 % of the above mentioned functional groups.

Another method of producing rubbers with reactive groups consists in introducing such groups subsequently into the rubber. Any known rubber may be used for this purpose. The following are particularly preferred: polybutadiene, polyisoprene, natural rubber, polyisobutylene, polychloroprene, trans-polypentenamer and copolymers of isoprene/isobutylene, butadiene/styrene, ethylene-propyleneterpolymers, acrylonitrile/butadiene and chlorosulphonyl polyethylene.

To introduce OH groups, the rubbers are heated, for example with p-nitrosophenol.

To produce the rubber mixtures according to this invention, it is preferred to use high molecular weight rubbers which contain OH groups as reactive groups.

Suitable liquid polymers or copolymers of a diene are in particular polymers of diene hydrocarbons which contain 4 to 12 carbon atoms and have a molecular weight of 400 to 10,000 and a viscosity of 50 to 2,000 poises at 20°C.

These dienes are unsubstituted, 2-substituted or 2,3-disubstituted 1,3-dienes which contain up to about 12 carbon atoms. The diene preferably contains up to 6 carbon atoms and the substituents in the 2- and/or 3- position may be hydrogen atoms, allyl groups, lower alkyl groups, (e.g. with 1 to 4 carbon atoms,) aryl groups (substituted or unsubstituted) halogen atoms, nitro or nitrile groups, etc.. Typical dienes suitable for the purpose are 1,3-butadiene, isoprene, chloroprene, 2- and/or 3-position may be hydrogen atoms, allyl groups, lower alkyl groups, (e.g. with 1 to 4 carbon atoms), aryl groups (substituted or unsubstituted), halogen atoms, nitro or nitrile groups, etc.. Typical dienes suitable for the purpose are 1,3-butadiene, isoprene, chloroprene, 2-cyano-1,3-butadiene, 2,3-dimethyl-1,3-butadiene.

The dienes may also be copolymerised with up to 75% by weight, based on the monomer mixture, of an α-olefinic monomer containing 2 to 12 carbon atoms. Suitable monomers for this purpose are e.g. styrene, vinyltoluene, methylmethacrylate, methyl acrylate, acrylic acid esters, vinyl chloride, vinylidene chloride, acrylonitrile, acrylic acid and acrylamide.

These polymers are known and are prepared by known methods. It is also known to introduce reactive groups into these products. This may be carried out, for example, on the principle of anionic polymerisation by which so-called living polymers are produced (cf. "Carbanions, Living Polymers and Electron Transfer Processes" Interscience Publishers, New York 1968; "Marcomoleculare Chemie" 35 (1969) 132) and these Living Polymers, which carry a carbanion at each end of the chain, are reacted with compounds which are subject to an addition reaction so that functional end groups are built up. Suitable compounds are for example, $CO_2$, alkylene oxides, sulphur, allyl bromide (cf. "Fortschritte Hochpolymer Forschung" Volume 2, pages 275–306 (1960). Radical polymerisation process may also be employed (cf. "Rubber Chemistry and Technology" Vol. 42/1969, page 76 et seq).

The rubber mixtures of the invention contain 50 to 400 parts by weight and preferably 100 to 200 parts by weight of liquid low molecular weight rubber for every 100 parts of high molecular weight rubber.

Selection of the cross-linking agents for the high molecular weight and the low molecular weight rubber depends on the kind of reactive groups present, e.g. polyisocyanates, diamines and polyamines, oxides of polyvalent metals, epoxides, carbodiimides and carboxy compounds, bis-oxazolines, polyoxazolines and iminoxazolidines are suitable; 0.5 to 10 equivalents of cross-linking agent should be available per mol of reactive groups in the rubber. Diisocyanates and polyisocyanates are particularly suitable, for example 2,4-tolylene diisocyanate, 2,6-tolylenediisocyanate and mixtures thereof, diphenylmethane-4,4'-diisocyanate; 3,3'-dimethyldiphenylmethane-4,4'-diisocyanate; 2,4-tolylenediisocyanate dimer; 1,5-naphthalene diisocyanate; m-phenylenediisocyanate; triphenylmethane-4,4'',4'''-triisocyanate; hexamethylenediisocyanate; 1-isocyanato-3,3,5-trimethyl-5-isocyanatomethyl-cyclohexane and diisocyanates and polyisocyanates which are obtained by condensation of aniline and formaldehyde and subsequent phosgenation.

The following compounds, if they are at least difunctional or divalent, may also be used for cross-linking reactive carboxyl groups: amines, epoxides, carbodiimides or metal oxides of polyvalent metals, oxazolines, and iminooxazolidines.

Suitable amines are, for example, methyl pentaethylenehexamine, methyltetraethylenetetramine, methylhexamethylenediamine and aziridinyl compounds, e.g. hexa-1-(2-methyl)-aziridinyl-triphosphatriazine, tris-1-(2-methyl)-aziridinylphosphine oxide, bis-1-(2-methyl)-aziridinyl-phenyl-phosphine oxide and trimesoyl-1-(2-ethyl)-aziridine.

Suitable metal oxides are e.g. zinc oxide, magnesium oxide, beryllium oxide or cadmium oxide.

Examples of suitable epoxides are 1,2,3,4-diepoxybutane; 3,4-epoxy-6-methyl-cyclohexylmethyl-3,4-epoxy-6-methyl-cyclohexane carboxylate. Suitable oxazolines are e.g. 1,4-phenylenebisoxazoline and vinyliminoxalidine.

Carboxylic acids which are at least difunctional for example aliphatic dicarboxylic acids which contain 3 to 6 carbon atoms, may also be used for cross-linking reactive OH, SH, or $NH_2$ groups.

The rubber mixtures according to the invention may contain any of the usual carbon blacks white fillers, plasticisers, antioxidants and other additives commonly used with rubbers.

The rubber composition is prepared by mixing with the components in conventional mixing devices. Mixing is very easy as a low viscosity mixture is formed. Therefore simple mixing apparatus may be used, stirrers such as light stirring gear with low energy consumption. The mixture may also be prepared continuously. The rubber mixtures of this invention are suitable for producing articles with a complicated shape and motor car tires by injection moulding, very high quality elastomer products being obtained after cross-linking by heating.

The mixtures described in the following examples were prepared on laboratory rollers (150 × 300 mm). The constituents mixed in the sequence given in the examples, in which the figures denote parts by weight unless otherwise indicated. The mixing time was 20 to 25 minutes.

EXAMPLES 1 - 5

Table 1

|  | 1 | 2 | 3 | 4 | 5 |
|---|---|---|---|---|---|
| Polychloroprene[1] | 100.0 | 100.0 | 100.0 | 100.0 | 100.0 |
| Stearic acid | 1.0 | 1.0 | 1.0 | 1.0 | 1.0 |
| Magnesium oxide | 4.0 | 4.0 | 4.0 | 4.0 | 4.0 |
| Zinc oxide | 5.0 | 5.0 | — | 5.0 | — |
| synthetic plastizer[2] | 50.0 | — | — | — | — |
| Diethyleneglycol | 2.5 | — | — | — | — |
| silica | 60.0 | 60.0 | 60.0 | 60.0 | 60.0 |
| precipitated silicic acid | 35.0 | 35.0 | 35.0 | 35.0 | 35.0 |
| Ethylene thiourea | 1.0 | — | — | — | — |
| Polybutadiene glycol[3] | — | 50.0 | 50.0 | — | — |
| Polybutadiene carboxylic acid[4] | — | — | — | 50.0 | 50.0 |
| 4,4'-Diphenylmethanediisocyanate | — | 25.0 | 25.0 | 27.3 | 27.3 |
| Dibutyl tin dilaurate | — | 0.3 | 0.3 | — | — |
|  | 258.5 | 280.3 | 275.3 | 282.3 | 277.3 |

1) Commercial polychloroprene molecular weight 200.000, containing 0.4% by weight of OH groups.
2) Mineral oil, viscosity at 20°C cp 90 - 120, density 1.05 to 1.07.
3) Polybutadiene modified with OH, molecular weight 2,300, containing 0.8% by weight of OH groups.
4) Polybutadiene modified with COOH, molecular weight 6,000, containing 1.9% by weight of carboxylic acid groups.

Shaped products were produced from the mixtures indicated above and heated at 150°C for 30 minutes. The products are thereby completely cross-linked. The physical properties measured are summarised in Table 2.

Table 2

| Mixture | 1 | 2 | 3 | 4 | 5 |
|---|---|---|---|---|---|
| MS-5 | 9' | 34' | 16' | 1.6' | 1.6' |
| F | 59 | 87 | 76 | 80 | 84 |
| D | 755 | 305 | 225 | 225 | 250 |
| M 100 | 10 | 45 | 46 | 63 | 77 |
| M 300 | 17 | 86 | — | — | — |
| H | 52 | 70 | 68 | 76 | 78 |
| E | 45 | 47 | 50 | 40 | 42 |

Explanation
F = tensile strength in kg/cm$^2$ according to DIN 53504
D = elongation at break in % according to DIN 53504
M100 = modulus at 100% elongation in kg/cm$^2$ according to DIN 53504
M300 = modulus at 300% elongation in kg/cm$^2$ according to DIN 53504
H = Shore hardness A according to DIN 53505
E = impact elasticity in % according to DIN 53512
tan = free torsional oscillation according to DIN 53520
MS 5 = Mooney scorch time in 5 ME/120°C according to DIN 53524.

Mixture 1 is an ordinary rubber mixture which was used for comparison and in which the plasticiser was not crosslinked. Mixtures 2 and 3 are according to the invention. The low molecular weight rubber component used was polybutadiene glycol. Mixture 2 in addition contains zinc oxide, which was left out in mixture 3. Mixture 4 and 5 are also according to the invention but the low molecular weight component used was polybutadiene carboxylic acid. A cross-linking catalyst is unnecessary in this case. Sample 4 contains zinc oxide, sample 5 was prepared without zinc oxide. The physical properties measured are much better in those products in which the plasticizer was also cross-linked than in the products with non-cross-linked plasticizer (Example 1).

EXAMPLE 6

The experiment was carried out in every detail as in Examples 1 to 5. Table 3 shows the mixture and Table 4 the physical properties of the cross-linked product after it has been heated to 150°C for 60 minutes. The polybutadiene glycol used is the same product as that used in Examples 1 to 5. The hydroxyl-containing styrene-butadiene copolymer has the following properties:

Molecular weight approximately 250,000 modified with 3.0% of β-hydroxypropylacrylate.

Table 3

|  | 6 |
|---|---|
| Hydroxyl-containing styrene butadiene copolymer | 100.0 |
| Precipitated silicic acid | 30.0 |
| Polybutadiene glycol | 100.0 |
| Diphenylmethane-4,4'-diisocyanate | 60.0 |
| Dibutyl tin dilaurate | 0.6 |
|  | 380.6 |

Table 4

| F | 80 |
|---|---|
| D | 200 |
| M100 | 64 |
| H | 91 |
| E | 40 |

EXAMPLES 7 AND 8

Table 5 shows the composition of the mixture and Table 6 the physical data obtained after heating to 150°C for 30 minutes. The experiments were otherwise carried out in the same way as in Example 1 to 5. The styrene-butadiene copolymer did not contain any reactive groups and had a molecular weight of 250,000. The polybutadiene glycol used was the same product as that used in Examples 1 to 5. Sample 7 is an ordinary rubber mixture without polybutadiene glycol. Sample 8 corresponds to that described in Japanese Patent Application Sho-45-22617. The physical properties obtained indicate that no advantage is achieved by the method described in Japanese Patent Specification compared with a conventional rubber mixture.

The results also show that substantially better values are obtained with the corresponding mixture according to the invention described in Example 6.

Table 5

|  | 7 | 8 |
|---|---|---|
| Styrene butadiene | 100.0 | 100.0 |
| Stearic acid | 1.0 | 1.0 |
| Zinc oxide | 5.0 | 5.0 |
| Calcium carbonate | 50.0 | 50.0 |
| Polybutadiene glycol | — | 5.0 |
| Sulphur | 2.0 | 2.0 |
| Dibenzothiazyl disulphide | 1.2 | 1.2 |
| Diphenylguanidine | 0.6 | 0.6 |
| Tetramethylthiuramic monosulphide | 0.3 | 0.3 |
| 4,4'-Diphenylmethane diisocyanate | — | 2.5 |
|  | 160.1 | 167.6 |

Table 6

| F | 19 | 24 |
|---|---|---|
| D | 220 | 255 |
| H | 58 | 59 |
| E | 56 | 56 |

We claim:
1. A pasty vulcanizable rubber mixture which is free of elemental sulphur comprising
   a. 100 parts by weight of a high molecular weight rubber containing 0.5 to 8% by weight of OH or COOH groups,
   b. 50 to 40 parts by weight of a liquid homopolymer or copolymer of a diene having a molecular weight of 400 to 10,000 and containing 0.5 to 8% by weight of OH or COOH groups and
   c. 0.5 to 10 equivalents per equivalent of said OH and COOH groups present in said mixture of a cross-linking agent which is capable of reacting with the OH and COOH groups present.
2. The mixture of claim 1 wherein said crosslinking agent is polyisocyanate, a polyamine, a polyvalent metal oxide, an epoxide, a carbodiimide, a carboxy compound or an oxazoline.
3. The vulcanizate produced by heating the mixture of claim 1.

* * * * *